(12) United States Patent
Pyrzewski

(10) Patent No.: US 7,560,643 B2
(45) Date of Patent: Jul. 14, 2009

(54) SAFETY LINE WITH INTEGRAL POWER TRANSMISSION MEANS

(76) Inventor: Martin Pyrzewski, 429 Bruce St., Marine City, MI (US) 48039

( * ) Notice: Subject to any disclaimer, the term of this patent is extended or adjusted under 35 U.S.C. 154(b) by 465 days.

(21) Appl. No.: 11/041,018

(22) Filed: Jan. 21, 2005

(65) Prior Publication Data

US 2005/0189170 A1    Sep. 1, 2005

Related U.S. Application Data

(60) Provisional application No. 60/537,855, filed on Jan. 21, 2004.

(51) Int. Cl.
*H01B 7/00* (2006.01)
(52) U.S. Cl. .......................... 174/47; 174/115
(58) Field of Classification Search ............ 174/47, 174/115
See application file for complete search history.

(56) References Cited

U.S. PATENT DOCUMENTS 2,550,021 A * 4/1951 Rappl ........................... 49/167
4,726,314 A * 2/1988 Ayers ........................... 114/243
5,022,459 A * 6/1991 Chiles et al. .................. 165/11.1
5,442,810 A * 8/1995 Jenquin ......................... 455/66.1

* cited by examiner

*Primary Examiner*—Chau N Nguyen
(74) *Attorney, Agent, or Firm*—Raymond M. Galasso; Galasso & Associates LP.

(57) ABSTRACT

A safety line with integral power transmission means comprises an elongated sheath, an elongated tensile load carrying structure, an electrical extension cord and an air hose. The elongated tensile load carrying structure has a first body attachment structure at a first location thereof and a second body attachment structure at a second location thereof end. The electrical extension cord has a first electrical connector at a first end thereof and a second electrical connector at a second end thereof. The air hose has a first hose coupling at a first end thereof and a second hose coupling at a second end thereof. The elongated tensile load carrying structure, the electrical extension cord and the air hose each extend at least partially along the length of the elongated sheath within the elongated sheath.

8 Claims, 4 Drawing Sheets

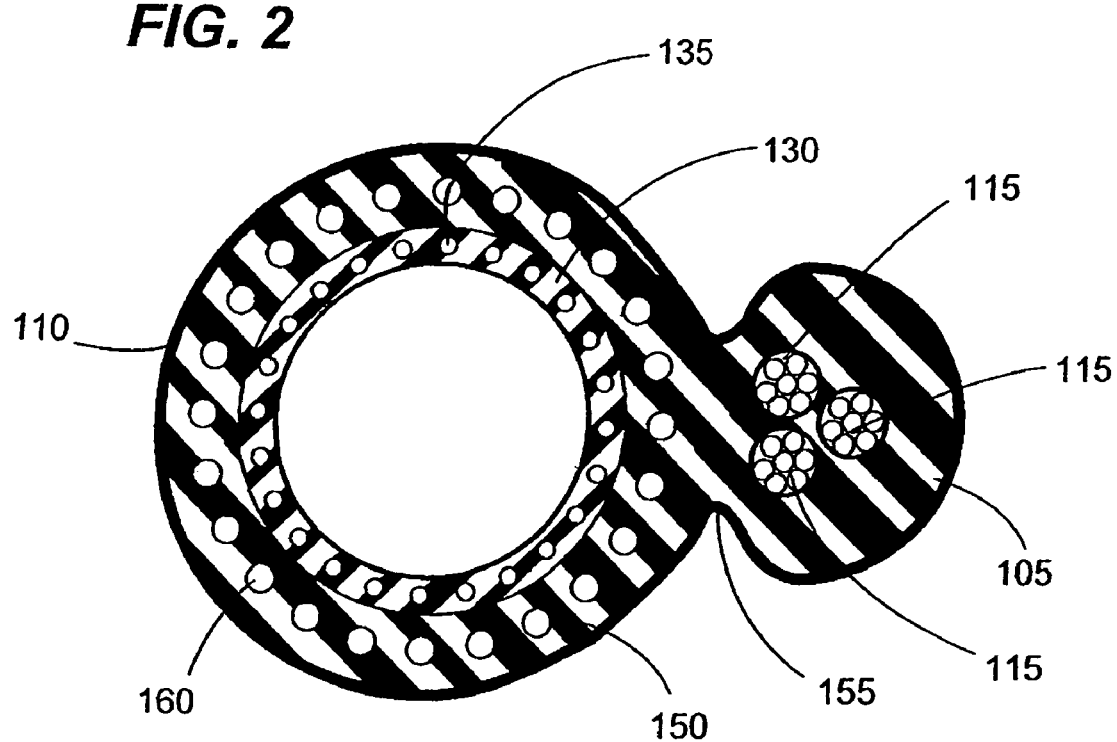
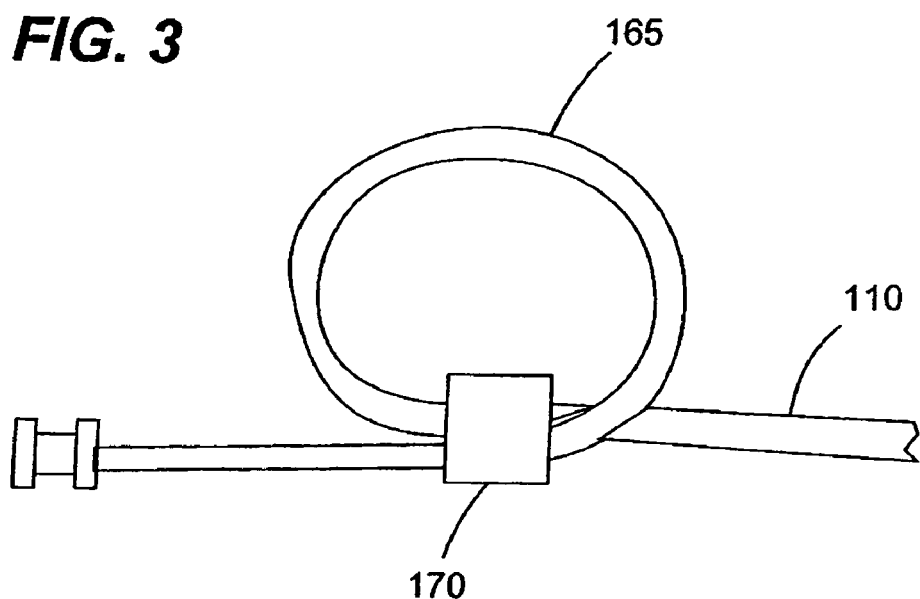

SAFETY LINE WITH INTEGRAL POWER TRANSMISSION MEANS

CROSS REFERENCE TO RELATED APPLICATIONS

This patent application claims priority to U.S. Provisional Patent Application having Ser. No. 60/537,855, filed on Jan. 21, 2004, entitled "Safety Line Electrical Cord And Air Hose", having a common applicant herewith and being incorporated herein in its entirety by reference.

FIELD OF THE DISCLOSURE

The disclosures made herein relate generally to safety lines for workers who work at significant distances above the ground and, more particularly, to a safety line with an integral power transmission means such as an electrical extension cord, an air hose or a pneumatic hose.

BACKGROUND

Certain types of workers frequently work on building structures at considerable distance above the ground. Roofers are a prime example of such types of workers. These types of workers are generally required to wear some type of safety device to provide protection against falling to the ground or lower elevation of the building structure. The worker fastens the safety line between themselves and a secure portion of the building structure (e.g., at their present work elevation or above their present work elevation) to preclude them from falling fully to the ground in the event of their falling off the building structure. Examples of conventional safety devices include a cable or a rope that can be attached between a worker and a fixed portion of the building structure.

It is common for a worker in such an elevated work environment to need access to one or more types of power for powering one or more pieces of equipment. Examples of such types of power include electrical power, pneumatic power and hydraulic power. Generally, a power source located at a remote location (e.g., on the ground or at a remote elevated location of a building structure) provides the electrical power, pneumatic power and/or hydraulic power. As is conventionally the case, a separate power cable or hose is used for transmitting a respective type of power from the power source to the worker.

The presence of the safety line along with one or more power cables and/or power hoses leads to safety concerns as well as productivity concerns. A worker having to navigate the safety line and any power cable(s) and/or hose(s) increases the potential for the worker to trip over such safety line, cable(s) or hose(s), which can result in bodily injury, damaged property, damaged equipment and/or damaged supplies, not to mention falling from the elevated work location to the ground or a lower elevation of the building structure. Thus, while such lines, cable(s) and/or hose(s) may be required, their individual presence is less than desirable and productive.

Therefore, a safety line apparatus having an integral power transmission means and that overcomes shortcomings associated with conventional approaches for routing power to a worker working at an elevated location on a building structure and providing protection against falling to the ground or lower elevation of the building structure would be useful, advantageous and novel.

SUMMARY OF THE DISCLOSURE

A safety line in accordance with the present invention overcomes shortcomings associated with conventional approaches for routing power to a worker working at an elevated location on a building structure and providing the worker with protection against falling to the ground or lower elevation of the building structure. To this end, such a safety line provides traditional safety line functionality for a worker working at an elevated location on a building structure and includes an integral means for routing power to such worker. The safety line and integral means for routing power to such worker (i.e., an integral power transmission means) takes the place of a safety line and one or more separate electrical extension cords and/or fluid power hoses (e.g., an air hose). By integrating one or more electrical extension cords and/or fluid power hoses with the safety line, safety and productivity are advantageously impacted, as the worker no longer has to individually navigate and/or manipulate the safety line, electrical extension cord(s) and/or fluid power hose(s). In this manner, the potential for the worker tripping over such safety line, cable(s) or hose(s), which could otherwise result in bodily injury, damaged property, damaged equipment and/or damaged supplies, is reduced.

In accordance with one embodiment of the present invention, a safety line with integral power transmission means comprises an elongated sheath, an elongated tensile load carrying structure, an electrical extension cord and an air hose. The elongated tensile load carrying structure has a first body attachment structure at a first location thereof and a second body attachment structure at a second location thereof end. The electrical extension cord has a first electrical connector at a first end thereof and a second electrical connector at a second end thereof. The air hose has a first hose coupling at a first end thereof and a second hose coupling at a second end thereof. The elongated tensile load carrying structure, the electrical extension cord and the air hose each extend at least partially along the length of the elongated sheath within the elongated sheath.

In accordance with another embodiment of the present invention, a safety line with integral power transmission means comprises an elongated sheath, a plurality of elongated electrical conductors, an elongated hose configured for carrying fluid therethrough and an elongated tensile load carrying structure. The elongated electrical conductors extend at least partially along a length of the elongated sheath within the elongated sheath. The elongated hose extends at least partially along the length of the elongated sheath within the elongated sheath. The elongated tensile load carrying structure extends at least partially along the length of the elongated sheath within the elongated sheath.

In accordance with another embodiment of the present invention, a safety line with integral power transmission means comprises a cable, an electrical extension cord, and an air hose. The cable has a first end and a second end. The electrical extension cord is engaged with the cable at a plurality of locations along the cable. The air hose is engaged with the cable at a plurality of locations along the cable.

Turning now to specific aspects of the present invention, in at least one embodiment, the elongated tensile load carrying structure at least partially encompasses the elongated hose.

In at least one embodiment, the elongated tensile load carrying structure includes a braided lining at least partially encompassing the elongated hose and extending at least partially along the length of the elongated sheath.

In at least one embodiment, the elongated hose and the braided lining are comprised by a fluid carrying hose and the fluid carrying hose extends at least partially along the length of elongated sheath within the elongated sheath.

In at least one embodiment, the elongated tensile load carrying member, the elongated hose and the elongated electrical conductors extend generally parallel to each other over a substantial length of the elongated sheath.

In at least one embodiment, a steel cable comprises the elongated tensile load carrying structure.

In at least one embodiment, a hose coupling is structurally engaged with the elongated tensile load carrying structure and is communicatively engaged with an end of the elongated hose in a manner enabling fluid to be communicated therethrough.

In at least one embodiment, the elongated tensile load carrying structure includes a first body attachment structure attached thereto at a first location thereof and a second body attachment structure attached thereto at a second location thereof.

In at least one embodiment, the first location of the elongated tensile load carrying structure is adjacent a first end of the elongated tensile load carrying structure and the second location of the elongated tensile load carrying structure is intermediate the first location of the elongated tensile load carrying structure and a second end of the elongated tensile load carrying structure.

These and other objects and embodiments of the inventive disclosures made herein will become readily apparent upon further review of the following specification and associated drawings.

BRIEF DESCRIPTION OF THE DRAWINGS

FIG. 2 is a cross sectional view taken along the line 2-2 in FIG. 1.

FIG. 3 depicts an embodiment of the air hose portion of the safety line depicted in FIG. 2 formed to provide a body attachment structure.

DETAILED DESCRIPTION OF THE DRAWINGS

Figure 1:
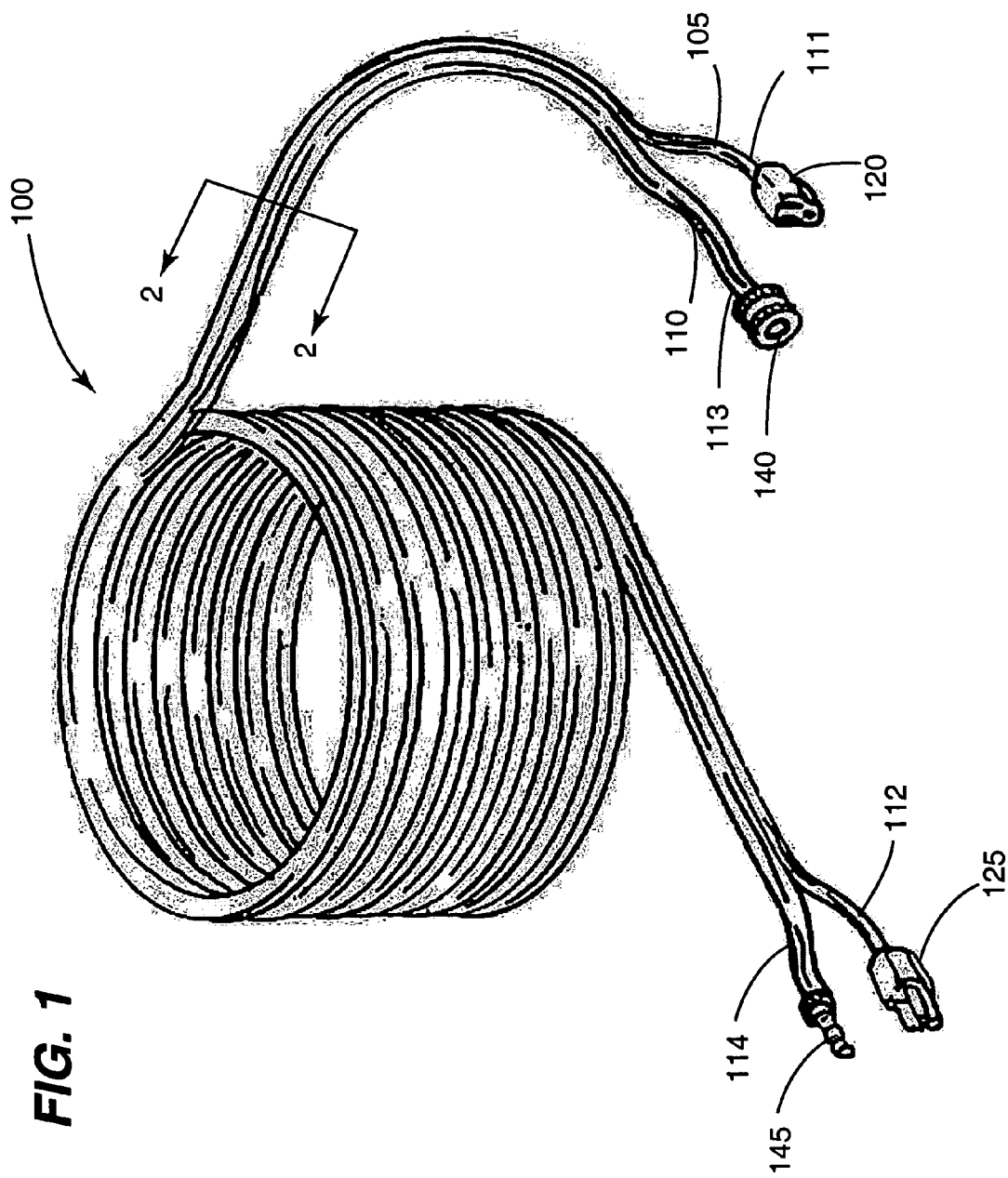
FIG. 1 depicts a safety line with integral power transmission means and having a tubular shaped tensile load carrying structure.

FIGS. 1 and 2 depict a safety line 100 in accordance with a first embodiment of the present invention. The safety line 100 includes integral power transmission means. Thus, the safety line 100 is configured for routing power to a worker working at an elevated location on a building structure and providing the worker with protection against falling to the ground or lower elevation of the building structure.

The safety line 100 includes an electrical extension cord portion 105 and an air hose portion 110. Individually and in combination, the electrical extension cord portion 105 and the air hose portion 110 are examples of integral power transmission means. The air hose portion 110 is an example of a fluid carrying portion, which may be configured for carrying a fluid such as hydraulic oil rather than air. The electrical extension cord 105 and the air hose portion 110 are attached to each over a substantial portion of their respective lengths. The electrical extension cord portion 105 includes a first end 111 and a second end 112. The air hose portion 110 includes a first end 113 and a second end 114. Preferably, but not necessarily, the electrical extension cord portion 105 and the air hose portion 110 are detached (e.g., in a v-shaped fashion) from each other at their respective first ends (111, 113) and at their respective second ends (112, 114).

The electrical extension cord portion 105 includes a plurality of individually insulated electrical conductors 115 such as, for example, individually insulated stranded wires. The electrical conductors 115 may be provided in any number of configurations. Examples of such configurations include, but are not limited to, jointly twisted and/or within a covering (e.g., as would be the case with a typical standalone extension cord). At the first end 111 of the electrical extension cord portion 105 portion, a first electrical plug 120 (e.g., a female plug) is attached to each one of the electrical conducts 115 for enabling connection of the electrical conductors 115 at their respective first ends to a power source or electrically powered apparatus (e.g., an electrically powered tool). At the second end 112 of the electrical extension cord portion 105, a second electrical plug 125 (e.g., a male plug) is attached to each one of the electrical conducts 115 for enabling connection of the electrical extension cord portion 105 at their respective second ends to a power source or electrically powered apparatus (e.g., an electrically powered tool).

The air hose portion 10 includes an elongated hose 130. Preferably, but not necessarily, the elongated hose 130 includes a reinforcement lining (referred to generally at 135) for enhancing the hoop strength of the elongated hose 130. With respect to the reinforcement lining 135 being capable of carrying a relatively high tensile force, the reinforcement lining 135 is an example of an elongated tensile load carrying structure in accordance with the present invention.

At the first end 113 of the air hose portion 110, a first air hose coupling 140 (e.g., a female coupling) is attached to the elongated hose 130 for enabling connection of the elongated hose 130 at its respective first end to a compressed air supply or pneumatic apparatus (e.g., a pneumatic tool). At the second end 114 of the air hose portion 110, a second air hose coupling 145 (e.g., a male coupling) is attached to the elongated hose 130 for enabling connection of the elongated hose 130 at its respective second end to a compressed air supply or pneumatic apparatus (e.g., a pneumatic tool). As is conventionally the case, the first air hose coupling 140 and the second air hose coupling 145 are communicatively engaged with a respective one of the ends of the elongated hose 130 for enabling air to be communicated through the air hose portion 110 and are structurally engaged with the elongated hose 130 (e.g., via a compressed metal ferrule or sleeve).

A flexible sheath 150 is provided over the plurality of electrical conductors 115 and the elongated hose 130. In one embodiment, the sheath 150 is formed from a polymeric material such as vinyl using an extrusion process. The flexible sheath 150 includes undercut regions 155 between the electrical extension cord portion 105 and the air hose portion 110 for enable convenient, controlled and/or predictable separation of electrical extension cord portion 105 from the air hose portion 110.

Preferably, but not necessarily, the safety line 100 includes a dedicated tensile load carrying structure (denoted generally at 160), which at least partially encompasses the elongated hose 130 within the sheath 150. A braided metallic material (e.g., steel mesh) and a braided polymeric material (e.g., nylon mesh) are examples of the dedicated tensile load carrying structure 160.

FIG. 3 depicts an embodiment of an arrangement for enabling the safety line 100 to be connected to a worker and/or a fixed portion of a building structure. A loop 165 (i.e., a body attachment structure) is formed in the air hose portion 110 of the safety line 110 and is secured via a mechanical structure such as, for example, a crimp sleeve 170. Preferably, a first loop (i.e., a first body attachment structure) is formed adjacent the first end 113 of the air hose portion 110 and a second loop (i.e., a second body attachment structure) is formed at a location intermediate the first loop and the second end 114 of the air hose portion 110. Accordingly, a suitable coupling device (e.g., a karabiner) may be used for securing the safety line 100 to a worker and to a fixed portion of the building structure.

It is disclosed herein that more than body attachment structures may be provided for enabling various points of attachment. For example, three or more body attachment structures may be spaced along the length of the safety line 100 to provide a plurality of available attachment locations. This type of arrangement is useful in that it provides for a variable effective length of the safety line.

Figure 4:
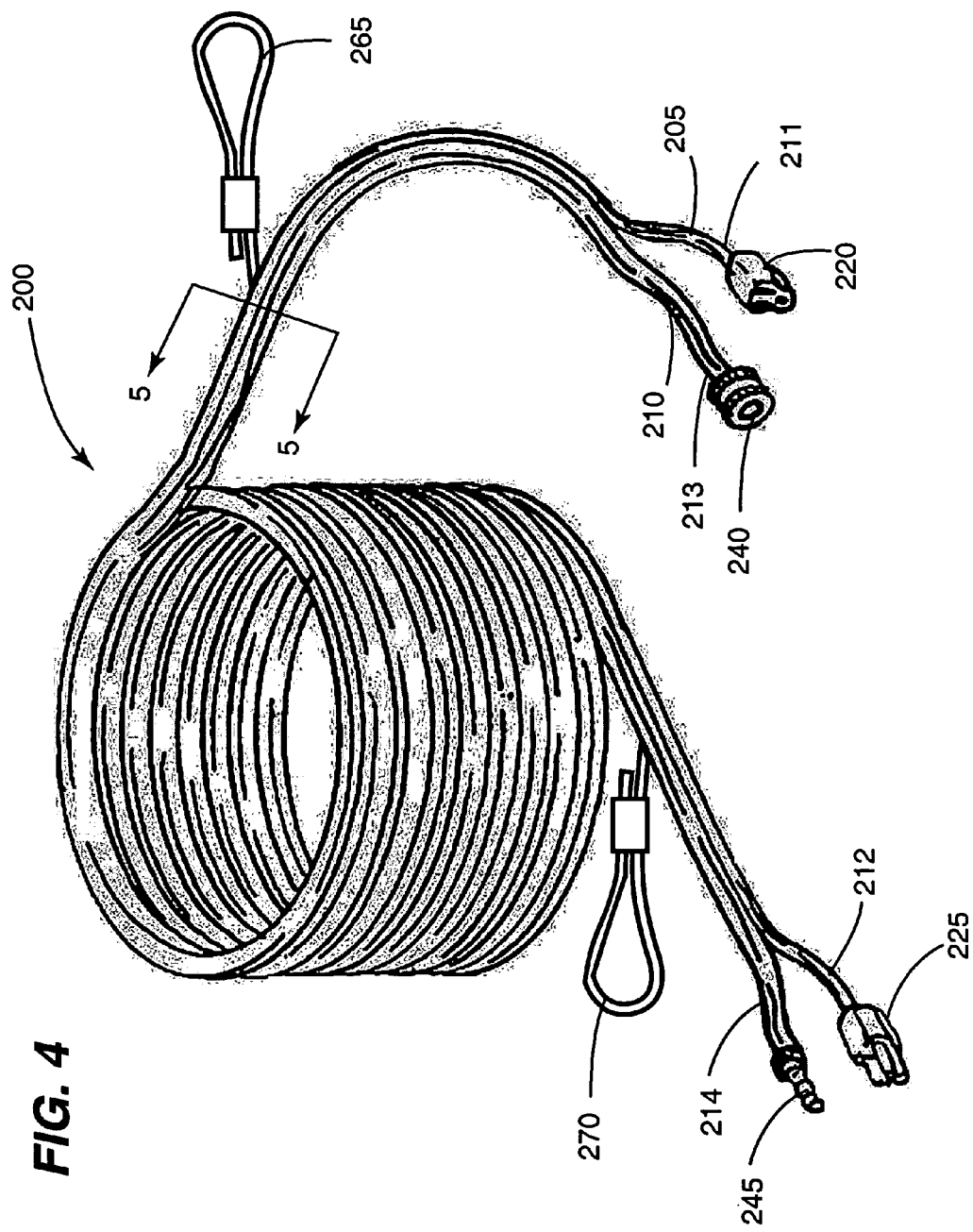
FIG. 4 depicts a safety line with integral power transmission means and having a tensile load carrying structure in the form of a structural cable.
Figure 5:
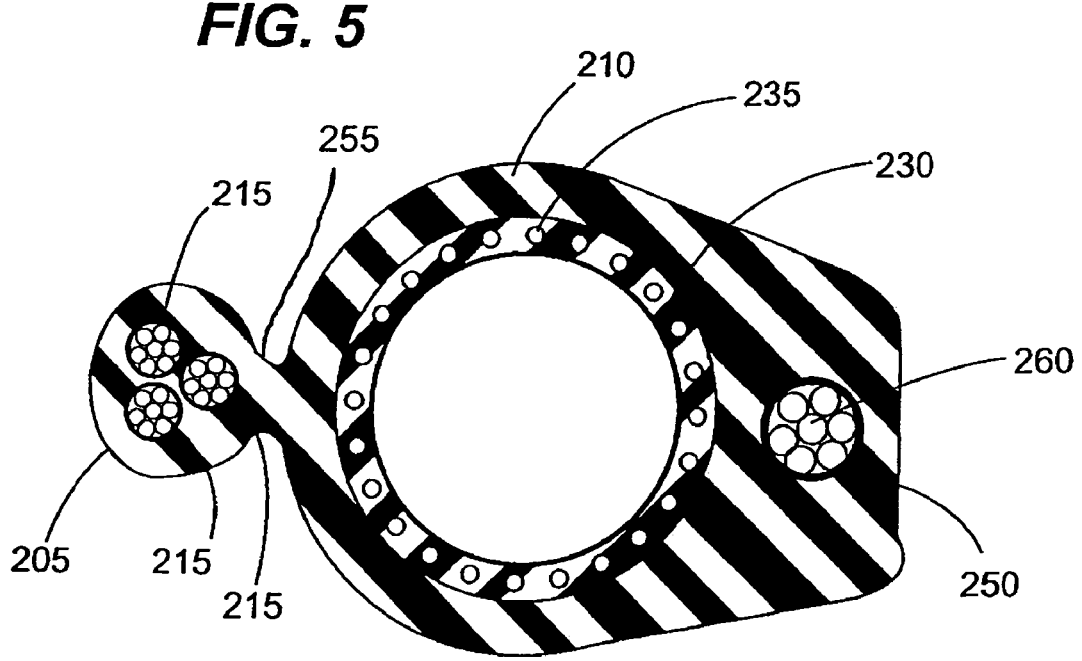
FIG. 5 is a cross sectional view taken along the line 5-5 in FIG. 4.

FIGS. 4 and 5 depict a safety line 200 in accordance with a second embodiment of the present invention. The safety line 200 includes integral power transmission means. Thus, the safety line 200 is configured for routing power to a worker working at an elevated location on a building structure and providing the worker with protection against falling to the ground or lower elevation of the building structure.

The safety line 200 includes an electrical extension cord portion 205 and an air hose portion 210. Individually and in combination, the electrical extension cord portion 205 and the air hose portion 210 are examples of integral power transmission means. The air hose portion 210 is an example of a fluid carrying portion, which may be configured for carrying a fluid such as hydraulic oil rather than air. The electrical extension cord 205 and the air hose portion 210 are attached to each over a substantial portion of their respective lengths. The electrical extension cord portion 205 includes a first end 211 and a second end 212. The air hose portion 210 includes a first end 213 and a second end 214. Preferably, but not necessarily, the electrical extension cord portion 205 and the air hose portion 210 are detached (e.g., in a v-shaped fashion) from each other at their respective first ends (211, 213) and at their respective second ends (212, 214).

The electrical extension cord portion 205 includes a plurality of individually insulated electrical conductors 215 such as, for example, individually insulated stranded wires. The electrical conductors 215 may be provided in any number of configurations. Examples of such configurations include, but are not limited to, jointly twisted and/or within a covering (e.g., as would be the case with a typical standalone extension cord). At the first end 211 of the electrical extension cord portion 205 portion, a first electrical plug 220 (e.g., a female plug) is attached to each one of the electrical conducts 215 for enabling connection of the electrical conductors 215 at their respective first ends to a power source or electrically powered apparatus (e.g., an electrically powered tool). At the second end 212 of the electrical extension cord portion 205, a second electrical plug 225 (e.g., a male plug) is attached to each one of the electrical conducts 215 for enabling connection of the electrical extension cord portion 205 at their respective second ends to a power source or electrically powered apparatus (e.g., an electrically powered tool).

The air hose portion 210 includes an elongated hose 230. Preferably, but not necessarily, the elongated hose 230 includes a reinforcement lining (referred to generally at 235) for enhancing the hoop strength of the elongated hose 230. With respect to the reinforcement lining 235 being capable of carrying a relatively high tensile force, the reinforcement lining 235 is an example of an elongated tensile load carrying structure in accordance with the present invention.

At the first end 213 of the air hose portion 210, a first air hose coupling 240 (e.g., a female coupling) is attached to the elongated hose 230 for enabling connection of the elongated hose 230 at its respective first end to a compressed air supply or pneumatic apparatus (e.g., a pneumatic tool). At the second end 214 of the air hose portion 210, a second air hose coupling 245 (e.g., a male coupling) is attached to the elongated hose 230 for enabling connection of the elongated hose 230 at its respective second end to a compressed air supply or pneumatic apparatus (e.g., a pneumatic tool). As is conventionally the case, the first air hose coupling 240 and the second air hose coupling 245 are communicatively engaged with a respective one of the ends of the elongated hose 230 for enabling air to be communicated through the air hose portion 210 and are structurally engaged with the elongated hose 230 (e.g., via a compressed metal ferrule or sleeve).

A flexible sheath 250 is provided over the plurality of electrical conductors 215 and the elongated hose 230. In one embodiment, the sheath 250 is formed from a polymeric material such as vinyl using an extrusion process. The flexible sheath 250 includes undercut regions 255 between the electrical extension cord portion 205 and the air hose portion 210 for enable convenient, controlled and/or predictable separation of electrical extension cord portion 205 from the air hose portion 210.

Preferably, but not necessarily, the safety line 200 includes a cable 260, which serves as a dedicated tensile load carrying structure. The cable 260 extends generally parallel with the electrical conductors 215 and air hose 230 within the sheath 250. Preferably, but not necessarily the cable 260 is made from braided steel.

For enabling the safety line 200 to be connected to a worker and/or a fixed portion of a building structure facilitating, a first loop 265 (i.e., a first body attachment structure) is formed in the cable 260 adjacent a respective first end of the safety line 200 and a second loop 270 (i.e., a second body attachment structure) is formed in the cable 260 at a location intermediate the first loop 275 and the respective second end of the safety line 200. Accordingly, a suitable coupling device (e.g., a karabiner) may be used for securing the safety line 200 to a worker and to a fixed portion of the building structure.

It is disclosed herein that more than body attachment structures may be provided for enabling various points of attachment. For example, three or more body attachment structures may be spaced along the length of the safety line 200 to provide a plurality of available attachment locations. This type of arrangement is useful in that it provides for a variable effective length of the safety line.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice embodiments of the inventive disclosures made herein. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A safety line with integral power transmission means, comprising:
    an elongated sheath;
    a plurality of elongated electrical conductors, wherein said elongated electrical conductors extend at least partially along a length of the elongated sheath within the elongated sheath;
    an elongated hose configured for carrying fluid therethrough, wherein the elongated hose extends at least partially along the length of the elongated sheath within the elongated sheath;
    an elongated tensile load carrying structure extending at least partially along the length of the elongated sheath within the elongated sheath; and
    a hose coupling communicatively engaged with an end of the elongated hose in a manner enabling said fluid to be communicated therethrough and structurally engaged with the elongated tensile load carrying structure.

2. The safety line of claim 1 wherein the elongated tensile load carrying structure includes:
    a first body attachment structure attached thereto at a first location thereof; and
    a second body attachment structure attached thereto at a second location thereof.

3. The safety line of claim 2 wherein:
    the first location is adjacent a first end of the elongated tensile load carrying structure; and
    the second location is intermediate the first location of the elongated tensile load carrying structure and a second end of the elongated tensile load carrying structure.

4. A safety line with integral power transmission means, comprising: a cable having a first end and a second end, wherein said cable includes a first body attachment structure attached thereto at a first location thereof and a second body attachment structure attached thereto at a second location thereof; and an electrical extension cord engaged with the cable at a plurality of locations along the cable, wherein said electrical extension cord includes a first electrical connector attached thereto at a first end thereof and a second electrical connector attached thereto at a second end thereof and an air hose engaged with the cable at a plurality of locations along the cable, wherein said air hose includes a first air fitting connector at a first end thereof and a second air fitting connector at a second end thereof; and a flexible sheath covering at least a portion of the cable, the electrical extension cord and the air hose, wherein the sheath facilitates engagement of the cable, the electrical extension cord and the air hose.

5. The safety line of claim 4, wherein:
    the first location is adjacent a first end of the cable; and
    the second location is intermediate the first location of the cable and a second end of the cable.

6. A safety line with integral power transmission means, comprising:
    an elongated sheath;
    an elongated tensile load carrying structure having a first body attachment structure at a first location thereof and a second body attachment structure at a second location thereof, wherein the elongated tensile load carrying structure extends at least partially along a length of the elongated sheath within the elongated sheath;
    an electrical extension cord having a first electrical connector at a first end thereof and a second electrical connector at a second end thereof, wherein the electrical extension cord extends at least partially along the length of the elongated sheath within the elongated sheath; and
    an air hose having a first hose coupling at a first end thereof and a second hose coupling at a second end thereof, wherein the air hose extends at least partially along the length of the elongated sheath within the elongated sheath.

7. The safety line of claim 6, wherein:
    the elongated tensile load carrying structure includes a braided lining at least partially encompassing the air hose and extends at least partially along the length of elongated sheath.

8. The safety line of claim 7 wherein:
    the first location is adjacent a first end of the elongated tensile load carrying structure; and
    the second location is intermediate the first location of the elongated tensile load carrying structure and a second end of the elongated tensile load carrying structure.

* * * * *